3 Sheets—Sheet 1.
J. L. CLARK & J. STANDFIELD.
Floating-Dock.
No. 169,010. Patented Oct. 19, 1875.
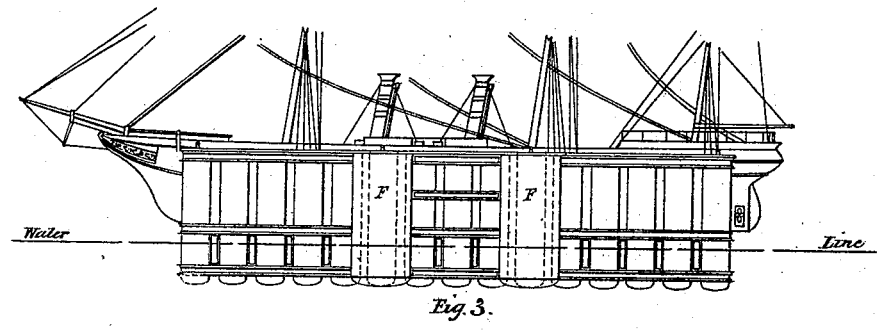
Fig. 3.
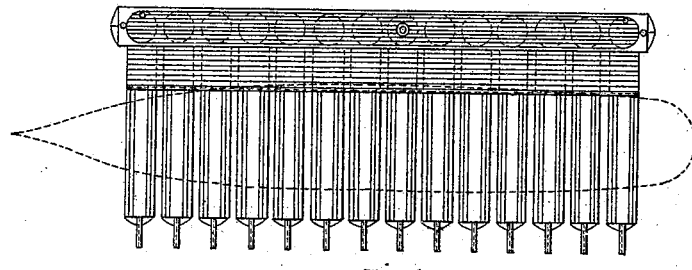
Fig. 1.
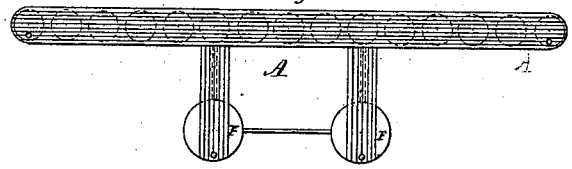
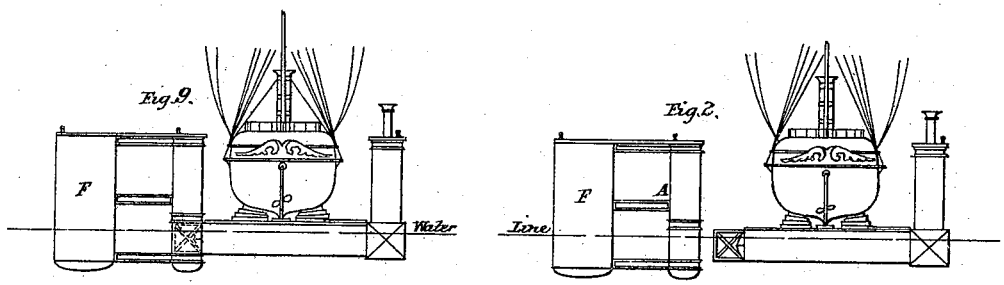
Fig. 9. Fig. 2.
Witnesses.
Harry King
B. H. Morse
Josiah L. Clark
John Standfield
Inventors.
By their Attorney
Wm. D. Baldwin 3 Sheets--Sheet 2.
J. L. CLARK & J. STANDFIELD.
Floating-Dock.
No. 169,010.          Patented Oct. 19, 1875.
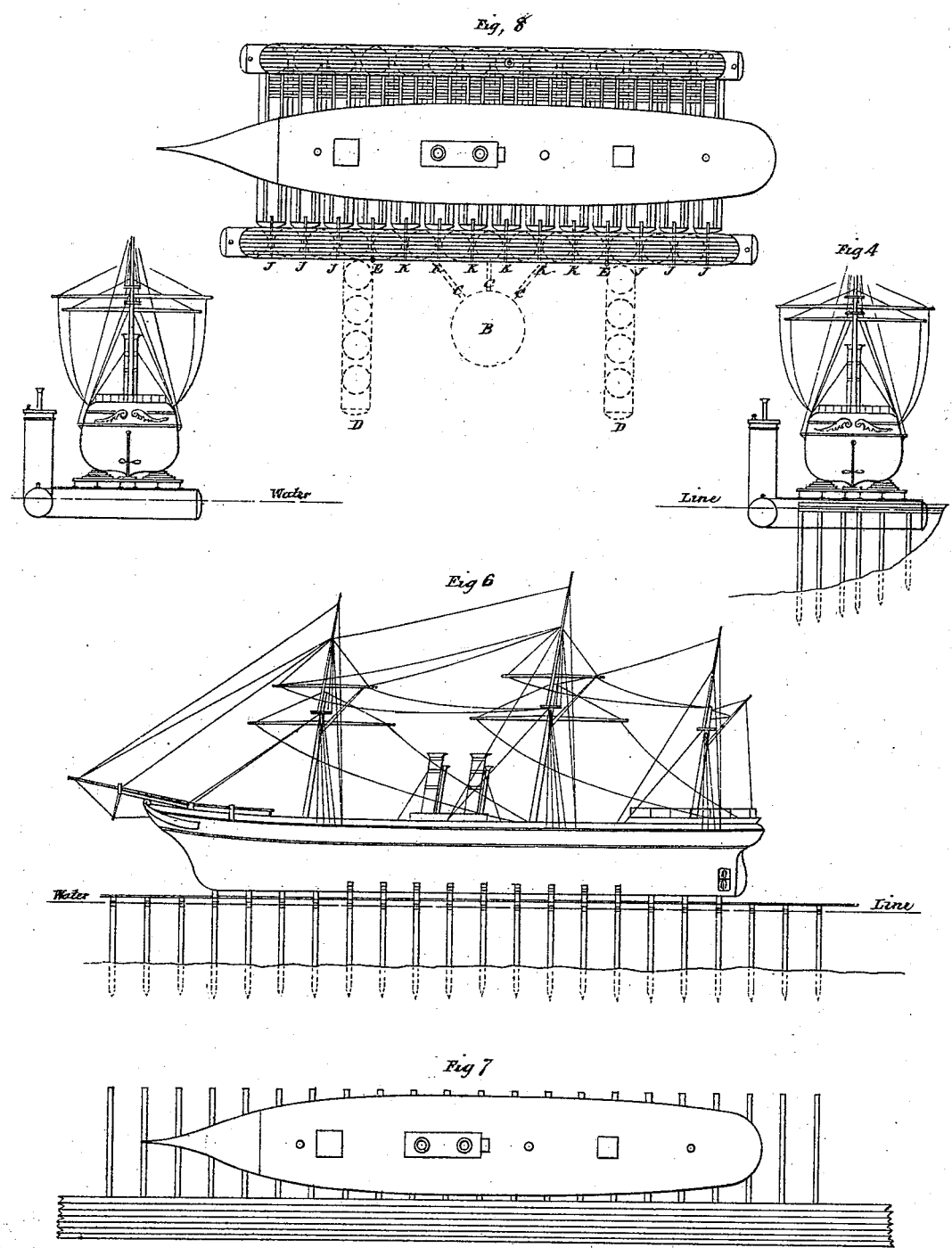

J. L. CLARK & J. STANDFIELD.
Floating-Dock.
No. 169,010.
3 Sheets--Sheet 3.
Patented Oct. 19, 1875.
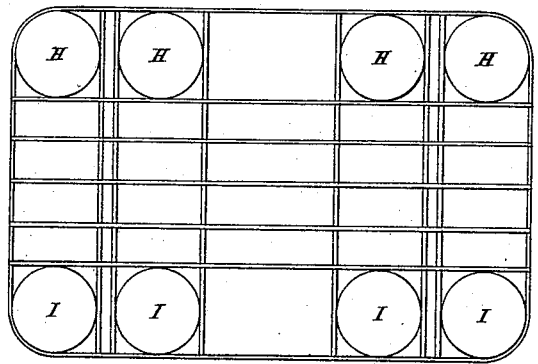
Fig 12
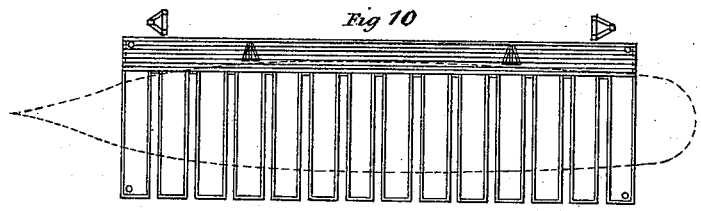
Fig 10
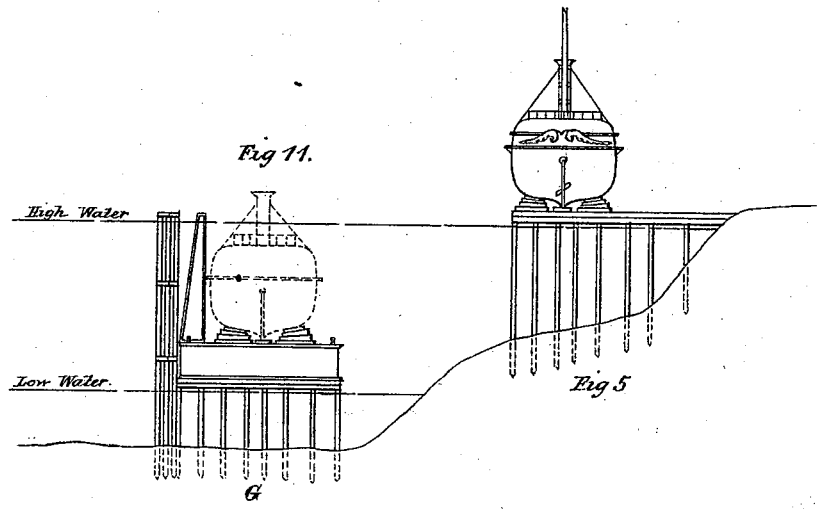
Fig 11.
Fig 5
Witnesses
Harry King
B. H. Morse
Josiah L Clark
John Standfield
Inventors
By their Attorney
Wm D. Baldwin

UNITED STATES PATENT OFFICE.

JOSIAH LATIMER CLARK AND JOHN STANDFIELD, OF WESTMINSTER, ENGLAND.

IMPROVEMENT IN FLOATING DOCKS.

Specification forming part of Letters Patent No. 169,010, dated October 19, 1875; application filed April 29, 1875.

*To all whom it may concern:*

Be it known that we, JOSIAH LATIMER CLARK and JOHN STANDFIELD, both of Westminster Chambers, Victoria street, Westminster, England, civil engineers, subjects of the Queen of Great Britain, have invented or discovered new and useful Improvements in Floating Docks or Pontons; and we, the said JOSIAH LATIMER CLARK and JOHN STANDFIELD, do hereby declare the nature of the said invention, and in what manner the same is to be performed, to be particularly described and ascertained in and by the following statement thereof—that is to say:

Our invention consists in so forming floating docks or pontons that they may be employed for raising vessels out of the water, and depositing them high and dry on fixed stages on piles driven in the water or projecting from the land. The dock consists of two sides or ends composed of a series of vertical tubes, and of a bottom composed of a series of transverse tubes; the tubes may be either square or circular, or of other suitable section. The bottom of the dock is, by preference, attached to one of these sides; but the other side is movable, and may at pleasure be either attached to it, so as to form the whole into a complete dock, or may be removed and floated away as a separate portion; or, if necessary, both sides may be floated away, so as to divide the dock into three parts. The main portion of the dock, therefore, consists of one side and the bottom. The bottom consists of a series of transverse tubes, which are attached to the side at one end only, and are separated from each other throughout the greater portion of their length, so that they resemble, in some degree, the teeth of a comb. They are of sufficient size and buoyancy to support the vessel, and also to carry the two vertical sides when the vessel is raised out of water. A series of rows of piles is driven into the water, each row being connected at top by longitudinal timbers, and the width or space between each row corresponds with the width of the tubes of the dock, so that the whole series of tubes, with the vessel upon them, may be floated in between the piles, and when in position, by admitting water, the tubes are lowered, and the ship, with or without a cradle, is deposited upon the piles. The dock may then be removed and employed to raise other vessels in a similar manner. To remove the ship off the staging the horizontal tubes of the dock are again floated between the piles, and the water within them is pumped or forced out, so as to raise the vessel, which is then floated away.

The dock, with its one side, with or without a vessel upon it, is perfectly stable when afloat, but would not be so when submerged. In order, therefore, to submerge the dock, the detached side is floated up to it and fitted or fastened onto it, the end of each of the horizontal tubes being provided with projections, which fit into suitable holes or slots in the side portion, and are keyed or fastened there, so as to form the whole into a complete floating dock. In this condition it may be submerged or raised at pleasure.

We sometimes prefer to arrange the horizontal tubes longitudinally with respect to the vessel, instead of transversely, in which case the vessel, with its cradle, is deposited on its staging end onto the shore.

In order that the said invention may be fully understood and readily carried in effect, we have shown in the drawings hereunto annexed various examples of slotted docks and pontons, with rows of staging projecting from the shore, which fit into corresponding slots of the docks and pontons.

Figure 1 shows a plan of the dock with a vessel upon it, and with the side A removed to admit of the dock being passed in between the projecting staging, for the purpose of depositing the vessel upon it. Fig. 2 is an end elevation of the same. Fig. 3 is a side elevation of the dock with a vessel upon it, and with the removable side in position; and Fig. 9, an end elevation of the same. Fig. 4 shows an end elevation of the dock in the act of depositing the vessel upon the projecting stage.

It will be seen in this drawing that both the dock and staging are directly under the vessel, the weight of which at first rests on the ponton or dock. As soon, however, as this is lowered, the vessel takes its bearing upon the piles, and is securely shored there. The dock is now further lowered until the vessel rests wholly upon the piles, and is finally withdrawn altogether, leaving the vessel deposited on the staging.

Fig. 5 shows an end elevation of the vessel deposited on the stage; Fig. 6, a side elevation, and Fig. 7 a general plan, of the same. Fig. 8 shows a general plan of the dock with the movable side attached, but with two different modes of keeping the side vertical when it is detached from the dock. B is a large vertical floating cylinder, which is connected to the removed side by the girders C C C, and acts as a cantalever or catamaran, to keep it upright. In some cases we employ two or more floating cylinders, as shown at F on Figs. 1, 2, and 3. All these floating cylinders have either concave or convex ends, as also have the ends of all the vertical tubes shown in Figs. 1, 2, 3, and 4.

There are many other obvious means of keeping the movable side vertical while it is separated from the remainder of the dock. For example, the side portion may be kept vertical by causing it to slide in guides fixed to a quay-wall or to fixed columns; or it may be guided by a series of booms, with joints moving vertically, like a parallel rule; or the side may be divided into two or three portions, hinged together, so that one or two of them may be bent back at right angles, as shown at D, Fig. 8. In this case, as soon as the two portions of the dock are brought together, and the eight girders K K, Fig. 8, are inserted into their bearings, the two hinged sides are brought round into such a position as to receive the remaining girder J J J, and the whole dock is then in a position to be submerged, and to receive a vessel upon it.

In some cases we apply this system to pontons without sides. These pontons require to be raised and lowered by the rise and fall of tide, or upon a hydraulic dock, or within a floating dock, or in a dry-dock.

Fig. 10 shows a plan of a slotted ponton, and Fig. 11 an end elevation of the same, floated by a receding tide onto the low-level grid G, which is situated between high and low water mark. The valves in the bottom of the ponton are left open, and the tide again flows over it, leaving it submerged. At high water a vessel is brought over this ponton, and on the tide again receding the vessel becomes seated upon it, the water is allowed to flow out of it, and the valves are then closed. On the flood-tide the ponton, with the vessel seated upon it, floats, and at high water the ponton is run in between the slots of the staging, as before described, and on admitting water to the ponton the vessel becomes docked high and dry upon the projecting stage, as shown at Fig. 5. In a similar manner the vessel may be removed from the stage and again set afloat. The method of using such a slotted dock, in combination with a dry-dock or with a hydraulic lift, is sufficiently obvious and well understood.

Fig. 12 shows a general plan of a vertical tubular floating dock constructed with large vertical cylinders, and adapted for giving stability to such pontons while being raised and lowered. The four cylinders marked H form one vertical side, and the four cylinders marked I form the other side. These cylinders are braced together by transverse and longitudinal girders, and form a skeleton-dock, which is allowed to sink low enough to receive the ponton. The water is then pumped or forced from the cylinders until it takes a bearing under the ponton, so as to steady it and give it stability, the valves of the dock and ponton are opened, and the whole structure descends, ready to receive the vessel which is brought over it. It then becomes necessary to pump or force the water out of both the ponton and the dock, by doing which the whole structure rises, and the ship is docked. The dock is then again lowered, and the ponton, with the ship upon it, is floated away, and deposits the ship on the staging prepared for it.

We claim—

1. The floating dock and ponton constructed, substantially as hereinbefore described, with open-ended slots or comb-shaped openings in the bottom, for the purpose of raising vessels and depositing them on corresponding stages.

2. The stage constructed, as hereinbefore described, of a series of rows of piles, each row connected at top by a longitudinal timber, and having spaces between them, for the purpose specified.

3. The combination of the dock or ponton having slots or comb-shaped openings in its bottom, and the fixed stage of piles having corresponding openings, whereby the vessel may be lowered upon or raised from the stage, as set forth.

4. The floating dock constructed, substantially as hereinbefore set forth, of separate portions, and with one or both of its sides removable.

5. The hereinbefore-described method of depositing vessels high and dry upon fixed stages, and removing them therefrom, by means of the comb-shaped dock or ponton and the correspondingly-shaped stage, both constructed substantially as set forth.

JOSIAH LATIMER CLARK.
JOHN STANDFIELD.

Witnesses:
  G. F. WARREN,
  WILMER M. HARRIS,
  Both of No. 17 *Gracechurch Street, London.*